United States Patent [19]

Cudnohufsky

[11] Patent Number: 4,475,421
[45] Date of Patent: Oct. 9, 1984

[54] LATHE

[75] Inventor: Sylvester R. Cudnohufsky, Troy, Mich.

[73] Assignee: Triple R Hydraulics, Inc., Madison Heights, Mich.

[21] Appl. No.: 417,378

[22] Filed: Sep. 13, 1982

[51] Int. Cl.³ .............................................. B23B 21/00
[52] U.S. Cl. ...................................... 82/25; 82/14 A; 82/14 B
[58] Field of Search ............ 82/25, 21 A, 21 R, 21 B, 82/2 E, 54, 14 A, 14 B, 14 C

[56] References Cited

U.S. PATENT DOCUMENTS

| | | | |
|---|---|---|---|
| 1,014,706 | 1/1912 | Houghton | 82/21 A |
| 1,182,135 | 5/1916 | Bosler et al. | 82/25 |
| 2,238,019 | 4/1941 | Floeter | 82/25 |
| 2,316,405 | 4/1943 | Clausen . | |
| 2,332,805 | 10/1943 | Makant | 82/25 |
| 2,499,509 | 3/1950 | Kendall | 82/25 |
| 2,630,038 | 3/1953 | Buell et al. . | |
| 2,701,496 | 2/1955 | Wilson | 82/25 |
| 2,887,639 | 5/1959 | Dutcher . | |
| 3,315,550 | 4/1967 | Kylin | 82/25 |
| 3,353,429 | 11/1967 | Stuart et al. | 82/21 A |
| 3,427,907 | 2/1969 | Gajda et al. . | |
| 3,448,643 | 6/1969 | Kylin | 82/25 |
| 3,520,216 | 7/1970 | Jeanneret . | |
| 3,690,200 | 9/1972 | Weaver . | |
| 3,824,883 | 7/1974 | Wloszek | 82/1.2 |
| 3,871,252 | 3/1975 | Nann | 82/25 |
| 3,937,110 | 2/1976 | Renoux | 82/25 |

*Primary Examiner*—Leonidas Vlachos
*Assistant Examiner*—Jerry Kearns
*Attorney, Agent, or Firm*—Barnes, Kisselle, Raisch, Choate, Whittemore & Hulbert

[57] ABSTRACT

A lathe has two diametrically opposed and simultaneously operating tool slides which are powered so as to be displaceable toward and away from each other and the workpiece being machined. A timing mechanism, independent of the drive to each slide, interconnects the two slides to assure accurate equal displacement of the two slides toward and away from each other.

3 Claims, 4 Drawing Figures

LATHE

In order to improve the efficiency of lathes, particularly programmable lathes, it has been heretofore proposed to provide two diametrically opposed tool slides that are simultaneously operated by the same drive mechanism. In one type of such lathe a screw is threaded into both tool slides so that when the screw is rotated in opposite directions, either manually or by a motor, under the control of a programmable device, such as a pattern controlled stylus or a numerical control mechanism, the two slides are displaced toward and away from each other. In another lathe arrangement heretofore proposed one tool slide is powered by suitable means and the other slide is connected by a suitable timing mechanism, such as a screw, a gear train, belts, pulleys, etc., with the directly driven slide so as to shift the slides toward and away from each other in unison as the carriage on which the two slides are mounted is advanced in the feed direction. While the above described lathe arrangements do improve the efficiency of such lathes, an inherent drawback of such arrangements resides in the fact that they may result in dimensional machining errors, especially in the case of heavy cuts on the workpiece.

Where the two slides are powered by a single screw threaded into both slides, machining errors can result from the cumulative dimensional error in the pitch of the screw thread. In a lathe where the directly driven slide in turn drives the other slide through a timing mechanism, machining errors frequently result from the dimensional tolerances in the drive train itself or as a result of the stresses developed in the timing mechanism by reason of the load applied thereto. Thus, with the above described arrangements, depending upon the load applied to the two slides, there may be a differential of 0.002 to 0.003" or more displacement between the two slides.

The primary object of the present invention is to provide an arrangement in a lathe for displacing two opposed tool slides simultaneously toward and away from each other to the same highly accurate extent.

A more specific object of the present invention is to provide in a lathe of the type described a drive arrangement for displacing the two slides simultaneously and a timing mechanism interconnecting the two slides which is independent of the arrangement and, therefore, not subject to the load or stresses applied to the two slides as a result of the depth of cut or the feed rate. In other words, in accordance with the present invention the mechanism for driving the two slides is completely independent of the means for causing the two slides to move toward and away from each other to the same extent.

Other objects, features and advantages of the present invention will become apparent from the following description and accompanying drawings, in which.

Figure 1:
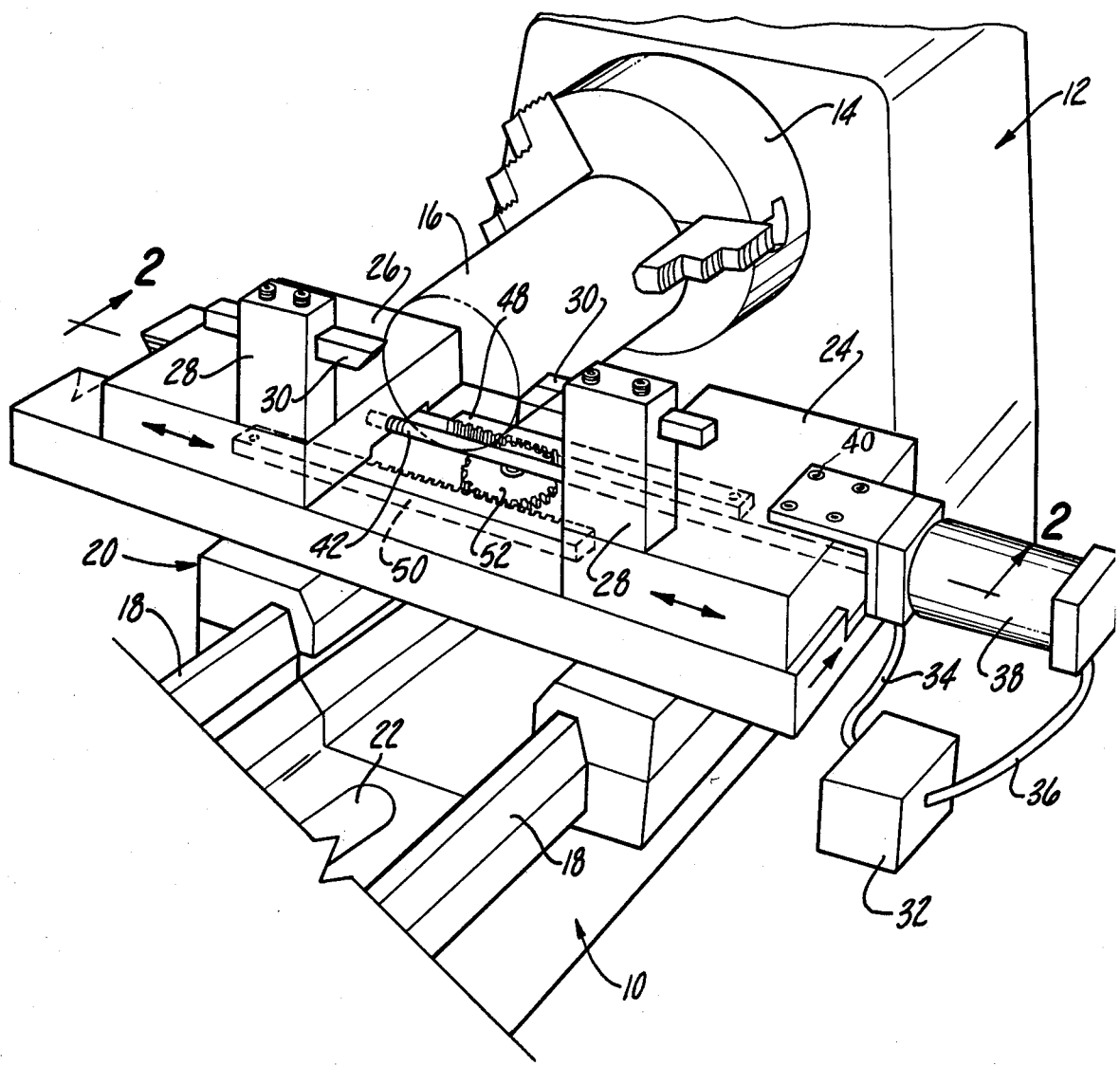
FIG. 1 is a fragmentary perspective view of a lathe embodying the present invention.
Figure 2:
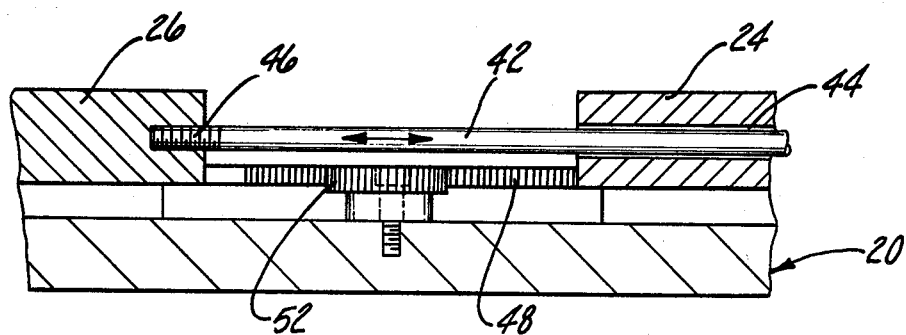
FIG. 2 is a view along the line 2—2 in FIG. 1.

In most respects the lathe illustrated in FIG. 1 is a conventional programmable lathe which includes a base 10 having a head 12 at one end on which a motor-driven chuck 14 is arranged for supporting and rotating a workpiece 16. Base 10 includes a pair of parallel ways 18 on which a carriage 20 is slideably guided. In the arrangement illustrated carriage 20 is moved longitudinally of ways 18 by means of a hydraulic cylinder, the piston rod of which is illustrated at 22. A pair of diametrically opposed tool slides 24,26 are slideably mounted on carriage 20 for movement toward and away from each other. Each tool slide has mounted thereon a tool block 28 which supports a cutting tool 30. Cutting tools 30 are preferably arranged in diametrically opposed relation in the same vertical plane.

A programmable mechanism for controlling the displacement of tool slides 24,26 is designated diagrammatically at 32 in FIG. 1. Mechanism 32 may be a numerical control unit, a tracer mechanism or any other mechanism for displacing slides 24,26 to produce the desired surface configuration on the workpiece being machined. Control mechanism 32 is connected by hydraulic conduits 34, 36 with a cylinder 38 which is fixedly mounted on tool slide 24 as by screws 40. A piston within cylinder 38 has a piston rod 42 which extends through an oversized bore 44 in slide 24 and is fixedly connected, as at 46, with the other tool slide 26. The piston in cylinder 38 is displaced relative to the cylinder by fluid directed to and from the cylinder by the control mechanism 32.

Tool slide 24 has fixed to the bottom side thereof a gear rack 48. A similar gear rack 50 is fixedly secured to the bottom side of tool slide 26. The two gear racks 48,50 extend in parallel relation with respect to each other and with respect to the path of travel of the two tool slides 24,26 relative to carriage 20. The opposing rows of teeth on the two gear racks 48,50 are interengaged by a pinion gear 52 which is journalled on carriage 20 between the two gear racks.

From the above description it will be observed that in operation, when the piston in cylinder 38 is displaced in response to actuation by the control mechanism 32, equal and opposite loads are applied to the two tool slides 24,26 by reason of the fact that cylinder 38 is mounted on tool slide 24 and the piston rod 42 operatively associated with cylinder 38 is anchored at its distal end on tool slide 26. Thus, regardless of the depth of cut of the two tools 30, the loads on the two tool slides are always equal and opposite.

While the extent of displacement of the piston in cylinder 38 is controlled by control mechanism 32, the displacement of each of the slides 24,26 relative to the total displacement of the piston in cylinder 38 is controlled exclusively by the gear racks 48,50 and the pinion gear 52. It will be observed that the load applied to the two tool slides 24,26 by the piston cylinder assembly is at no time transferred to the gear racks and the pinion. The two gear racks 48,50 and the pinion 52 simply provide a timing mechanism which assures that the two slides will be displaced toward and away from each other to the same extent to a high degree of accuracy. The accuracy of the displacement of the two slides relative to each other is independent of the depth of cut.

Figure 3:
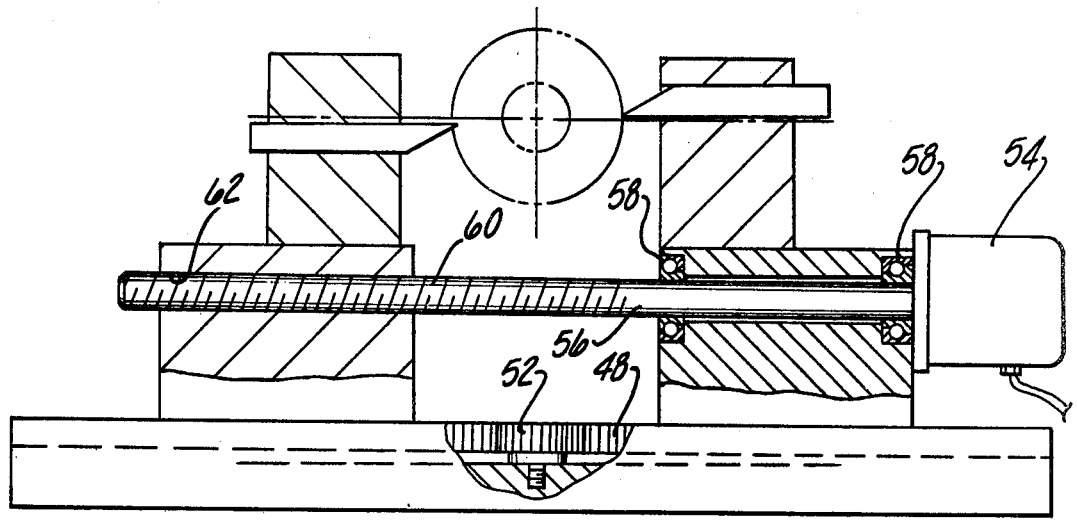
FIG. 3 is a fragmentary elevational view, partly in section, of another embodiment of lathe embodying the present invention.

In the arrangement shown in FIG. 3 the means for displacing the two slides 24,26 toward and away from each other on carriage 20 comprises an electric motor 54, the operation of which is controlled by a suitable programmable control unit. Motor 54 is fixedly mounted on tool slide 24 and its output shaft 56 extends through tool slide 24 and is journalled therein by means of bearings 58. The distal end portion of shaft 56 is threaded, as at 60, and is engaged in a threaded bore 62 in tool slide 26. The two tool slides 24,26 are interconnected by a timing mechanism substantially the same as that shown in FIG. 1 which includes the gear racks 48,50 and the pinion gear 52. It will be appreciated that, if manual operation of the slides is desired, motor 54 can be replaced by a hand wheel for rotating screw 56.

With the arrangement shown in FIG. 3 it will be appreciated that, when shaft 56 is rotated in opposite directions, the threaded connection between the shaft and tool slide 26 results in the two tool slides being displaced toward and away from one another. The extent of displacement of the two tool slides relative to each other is controlled exclusively by the timing mechanism consisting of the gear racks 48,50 and pinion gear 52. Thus, as is the case with the previous embodiment described, the two tool slides are designed to move toward and away from each other in exactly equal increments relative to the axis of rotation of the workpiece 16. This accuracy is unaffected by the load on the two tool slides resulting from the depth of cut. In view of the fact that motor 54 is fixedly mounted on tool slide 24 and shaft 56 is threaded into tool slide 26, the loads on the two tool slides are exactly equal and opposite.

Figure 4:
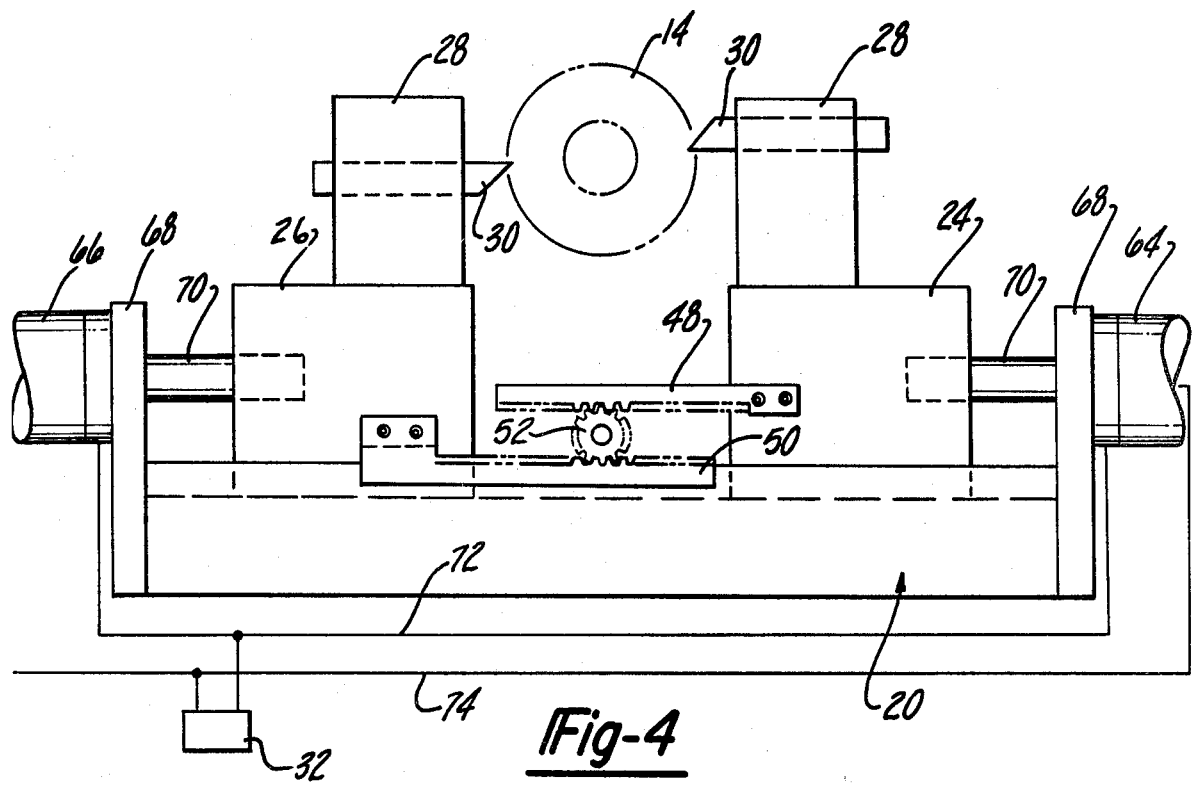
FIG. 4 is an elevational view, partly diagrammatic, of another embodiment of lathe embodying the present invention.

In the embodiment illustrated in FIG. 4 each tool slide 24,26 is independently powered by hydraulic cylinders 64,66. Each cylinder is fixedly mounted as by a bracket 68 on carriage 20 and the piston rods 70 of the respective cylinders are fixedly connected to the two tool slides. The corresponding ends of cylinders 64,66 are connected by common hydraulic conduits 72,74 which are in turn connected to the programming mechanism 32. Conduits 72,74 form the hydraulic supply and return lines for the two cylinders 64,66.

I claim:

1. In a lathe of the type which includes a base, a rotary driven head on the base for supporting a workpiece to be machined, a carriage on the base movable in a direction axially of the rotating workpiece, a pair of diametrically opposed tool slides having tools mounted thereon and being mounted on the carriage for rectilinear movement toward and away from each other in a direction radially of the rotating workpiece to cause the tools mounted on said slides to machine the rotating workpiece, that improvement which comprises, a reversible motor having a housing fixedly mounted on one of said slides, said motor having an output shaft extending parallel to the rectilinear path of travel of the tool slides, said output shaft extending from said motor to and connected directly with the other tool slide such that, when the motor is operated in opposite directions, said output shaft is placed in axial tension and compression and applies equal and opposite forces to the two slides to shift the slides on the carriage toward and away from the rotating workpiece and a timing mechanism for assuring precisely accurate equal displacements of the two tool slides in unison comprising a pair of gear racks fixedly mounted in opposed relation, one on each tool slide, and an idler pinion journalled on the carriage and meshing with each gear rack.

2. The improvement called for in claim 1 wherein said motor comprises a hydraulic piston-cylinder assembly, said cylinder comprising the motor housing and said output shaft comprises a rod fixedly connected at one end to the piston and fixedly connected at its other end to the other tool slide.

3. The improvement called for in claim 1 wherein said motor comprises an electric motor and said output shaft comprises a rotary shaft driven by the motor, the distal end of the output shaft having a threaded connection with said other tool slide.

* * * * *